US012523955B2

(12) United States Patent
Shibata

(10) Patent No.: US 12,523,955 B2
(45) Date of Patent: Jan. 13, 2026

(54) IMAGE FORMING APPARATUS CAPABLE OF TRANSITIONING TO ENERGY-SAVING MODE

(71) Applicant: KYOCERA Document Solutions Inc., Osaka (JP)

(72) Inventor: Yukihiro Shibata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/678,309

(22) Filed: May 30, 2024

(65) Prior Publication Data

US 2024/0402638 A1 Dec. 5, 2024

(30) Foreign Application Priority Data

Jun. 5, 2023 (JP) ................................ 2023-092305

(51) Int. Cl.
*G03G 15/00* (2006.01)

(52) U.S. Cl.
CPC ..... *G03G 15/5004* (2013.01); *G03G 15/5016* (2013.01)

(58) Field of Classification Search
CPC ....................... G03G 15/5004; G03G 15/5016
See application file for complete search history.

(56) References Cited

U.S. PATENT DOCUMENTS 5,652,950 A * 7/1997 Kim .................. G03G 15/2003 713/320

FOREIGN PATENT DOCUMENTS

JP H11316517 A 11/1999

* cited by examiner

*Primary Examiner* — Hoang X Ngo
(74) *Attorney, Agent, or Firm* — IP Business Solutions, LLC.

(57) ABSTRACT

An image forming apparatus includes a time measuring device and a control device. The time measuring device measures a predetermined time. The control device operates as a transition processor, a detector, and a determiner. The transition processor performs transition processing for allowing the image forming apparatus to transition to an energy-saving mode. The detector detects that the transition processing has been completed. The determiner determines, when not yet obtaining from the detector detection information indicating completion of the transition processing at a time when the time measuring device has measured lapse of the predetermined time from start of the transition processing, that the transition processing has not yet been completed.

6 Claims, 4 Drawing Sheets

IMAGE FORMING APPARATUS CAPABLE OF TRANSITIONING TO ENERGY-SAVING MODE

INCORPORATION BY REFERENCE

This application claims priority to Japanese Patent Application No. 2023-092305 filed on Jun. 5, 2023, the entire contents of which are incorporated by reference herein.

BACKGROUND

The present disclosure relates to image forming apparatuses.

There is known an image forming apparatus that transitions to a mode to lower the temperature of a fixing device and wait until an output of an image (a sleep mode).

SUMMARY

A technique improved over the aforementioned technique is proposed as one aspect of the present disclosure.

An image forming apparatus according to an aspect of the present disclosure includes a time measuring device and a control device. The time measuring device measures a predetermined time. The control device operates as a transition processor, a detector, and a determiner. The transition processor performs transition processing for allowing the image forming apparatus to transition to an energy-saving mode. The detector detects that the transition processing has been completed. The determiner determines, when not yet obtaining from the detector detection information indicating completion of the transition processing at a time when the time measuring device has measured lapse of the predetermined time from start of the transition processing, that the transition processing has not yet been completed.

DETAILED DESCRIPTION

Figure 1:
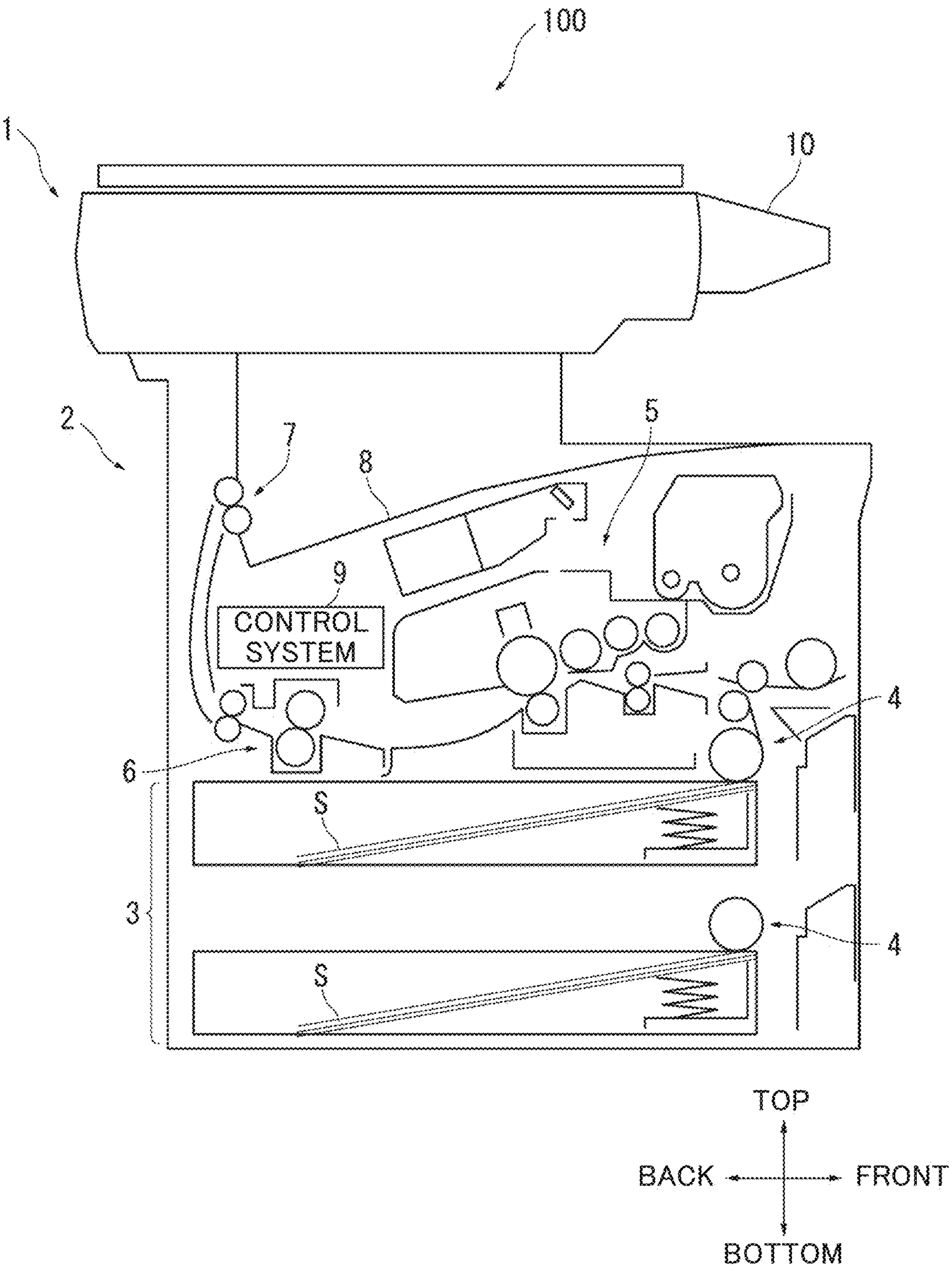
FIG. 1 is a view showing an image forming apparatus according to an embodiment of the present disclosure.

Hereinafter, a description will be given of an image forming apparatus according to an embodiment as an aspect of the present disclosure with reference to the drawings. Throughout the drawings, the same or equivalent parts and components are designated by the same reference characters and further description is omitted.

With reference to FIG. 1, an image forming apparatus 100 according to the embodiment of the present disclosure will be described.

As shown in FIG. 1, the image forming apparatus 100 forms an image on a sheet.

The image forming apparatus 100 includes a document reading device 1, an image forming unit 2, a sheet feed device 3, a sheet conveyance device 4, a sheet output device 7, a sheet output tray 8, a control system 9, and a display device 10.

The document reading device 1 reads an image formed on a document sheet and outputs image data on the image.

The image forming unit 2 comprises an image formation functional device 5 and a fixing device 6.

The sheet feed device 3 is capable of feeding a plurality of types of sheets toward the image formation functional device 5.

The sheet feed device 3 includes, as an example, sheet feed trays and sheet feed rollers.

The sheet feed tray accommodates a stack of sheets. The sheet feed roller picks up a sheet from the stack of sheets and feeds it to a conveyance path.

The sheet conveyance device 4 conveys the sheet fed by the sheet feed device 3 to the image formation functional device 5.

The sheet conveyance device 4 includes the conveyance path and a conveyance roller.

The sheet conveyance device 4 is formed of, for example, a sheet metal, wherein a sheet is conveyed along the conveyance path by the conveyance roller. For example, a plurality of conveyance rollers are disposed at different locations spaced apart from each other to convey the sheet toward the image formation functional device 5.

The image formation functional device 5 forms a toner image on the sheet.

When the image forming apparatus 100 is of an electrophotographic type, the image formation functional device 5 includes a toner supply unit and an image forming device.

The toner supply unit includes, as an example, a toner bottle. The toner bottle may be a toner cartridge composed of: a container; and a mechanism that supplies toner.

The image forming device includes a charging device, an exposure device, a developing device, a photoconductor, a cleaning device, a destaticizing device, and a transfer device.

The charging device charges a photosensitive layer of the photoconductor to a predetermined potential. An example of the charging device is a corona discharger.

The exposure device irradiates the photosensitive layer of the photoconductor with laser light to expose it to the laser light. The exposure device exposes the photosensitive layer of the photoconductor to light based on image data acquired from the control system 9. As a result, an electrostatic latent image is formed on the photoconductor. An example of the exposure device is an LED (light-emitting diode).

The developing device develops the electrostatic latent image on the photoconductor by the toner based on the image data.

An example of the photoconductor is a photoconductive drum. The photoconductive drum has a photosensitive layer on the peripheral surface. Examples of the photoconductive drum include a selenium drum and an OPC (organic photoconductor).

The transfer device transfers the toner image on the photoconductor to a sheet.

In the case of a direct transfer system shown in FIG. 1, the transfer device directly transfers the toner image from the photoconductor carrying the toner image to the sheet. In the case of an indirect transfer system different from the structure shown in FIG. 1, the transfer device primarily transfers the toner image to an unshown intermediate transfer member, such as a belt, and then secondarily transfers the toner image on the intermediate transfer member to a sheet being conveyed in the conveyance path. As an example, the transfer device includes a transfer roller that presses the sheet or the intermediate transfer member against the photoconductor.

The cleaning device cleans up residual toner remaining on the photoconductor after the transfer.

The destaticizing device removes electrostatic charge from the photosensitive surface of the photoconductor.

When the image forming apparatus 100 is of an electrophotographic type shown as an example in FIG. 1, the fixing device 6 applies heat and pressure to the toner image developed on the sheet to fix the toner image on the sheet. The fixing device 6 includes, for example, a fixing roller, a heater, and a pressing roller.

The fixing roller is, for example, a hollow cylindrical roller. The fixing roller is pressed against the pressing roller. The pressing roller and the fixing roller form a nip between them. The pressing roller is driven into rotation by an unshown drive device and forms a nip together with the fixing roller to rotate the fixing roller.

The heater is supplied with power from an unshown power source to apply heat to the fixing roller. The heater is disposed in proximity to an inner peripheral surface of the fixing roller. The sheet conveyed to the fixing device 6 is heated by the heater when passing through the nip and, thus, the toner image is fixed on the sheet.

The sheet output device 7 ejects the sheet with an image formed by the image formation functional device 5 to the outside of the image forming apparatus 100. The sheet output device 7 includes a sheet output roller. The sheet output roller ejects to the sheet output tray 8 the sheet conveyed from the fixing device 6 by the sheet conveying device. The sheet output tray 8 accommodates ejected sheets.

Examples of the display device 10 include a liquid crystal display and an organic EL (organic light-emitting diode (OLED)) display.

Next, a description will be given of the configuration and control of the control system 9 of the image forming apparatus 100 with reference not only to FIG. 1 but also to FIG. 2.

First, the configuration of the control system 9 will be described. FIG. 2 is a diagram showing the control system 9 of the image forming apparatus 100 according to this embodiment.

Figure 2:
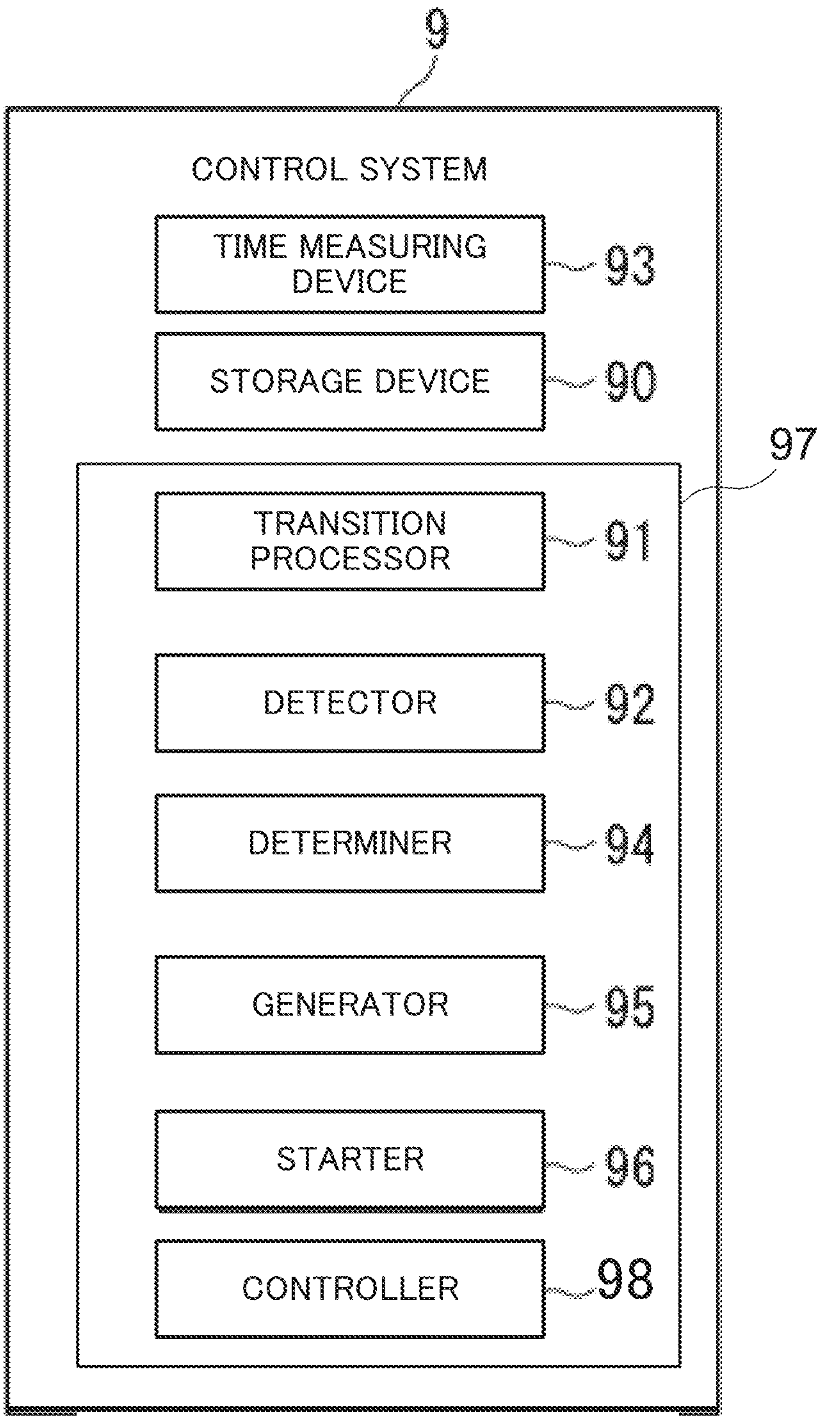
FIG. 2 is a diagram showing a control system of the image forming apparatus according to the embodiment.

As shown in FIG. 2, the control system 9 includes a storage device 90, a time measuring device 93, and a control device 97.

The storage device 90 includes, for example, an unshown non-volatile memory cell array and a control circuit.

An example of the time measuring device 93 is a timer.

The control device 97 is made up by including a processor, a RAM (random access memory), a ROM (read only memory), and a dedicated hardware circuit. The processor is, for example, a CPU (central processing unit), an ASIC (application specific integrated circuit) or an MPU (micro processing unit). The control device 97 includes a transition processor 91, a detector 92, a determiner 94, a generator 95, a starter 96, and a controller 98.

When the processor operates in accordance with a control program stored in the storage device 90, the control device 97 functions as the transition processor 91, the detector 92, the determiner 94, the generator 95, the starter 96, and the controller 98. However, these components, including the transition processor 91, may not be implemented by the operation of the control device 97 in accordance with the control program, but instead may be each constituted by a hardware circuit. Hereinafter, the same applies to the other embodiments unless otherwise stated.

The controller 98 governs the overall operation control of the image forming apparatus 100. The specified operations of the transition processor 91, the detector 92, the time measuring device 93, the determiner 94, the generator 95, and the starter 96 will be described hereinafter.

Next, a description will be given of the operation control of the image forming apparatus 100 and a deadlock.

The memory cell array of the storage device 90 holds the above-described control program for controlling the operation of the image forming apparatus 100 and data. The control device 97 accesses the memory cell array to read or write data from or on the memory cell array.

Examples of a memory cell include a DRAM (dynamic RAM: dynamic random access memory), an SRAM (static RAM: static random access memory), a flash memory, and an EEPROM (electrically erasable programmable read-only memory).

The control device 97 often accesses the memory cell array to simultaneously handle a plurality of processes (such as an image reading process and an image formation process). In order to simultaneously handle a plurality of processes, the control device 97 often executes a plurality of programs. Each of the plurality of programs may need specific resources (such as a CPU (central processing unit), a memory, a storage, a network bandwidth, and an input/output device).

However, when a plurality of processes are simultaneously handled, one of the processes may become waiting long for a resource in use for another one of the processes. Alternatively, for example, because of abnormal access to each component of the image forming apparatus 100, all the program processes may become unable to progress and, thus, a deadlock may occur in which the progress of the programs stops.

When the image forming apparatus 100 processes a task, such as an image formation job, the control device 97 may allow some of the components of the image forming apparatus 100 to transition to an energy-saving mode (referred to also as a sleep mode, a READY mode or a standby mode) for the purpose of reducing power consumption of the image forming apparatus 100.

For example, if such a deadlock as described above occurs during transition of the image forming apparatus 100 to the energy-saving mode, the operation of the image forming apparatus 100 is difficult to return to a normal condition and, thus, the image forming apparatus 100 may become disabled or go down to generate a downtime.

Alternatively, if a specific component has a problem, the image forming apparatus 100 may go down to generate a downtime at every energy-saving control.

When the device is restarted by the controller 98, the deadlock may be resolved. However, the restart of the device in this manner makes it difficult to identity the cause of failure of the processing for transition to the energy-saving mode and, therefore, may not lead to a fundamental solution to reduction of the downtime.

Next, a description will be given of the configurations and operations of the components of the control system 9 of the image forming apparatus 100 according to this embodiment. As described previously, the control system 9 includes, in addition to the storage device 90, the time measuring device 93 and the control device 97. The control device 97 includes the transition processor 91, the detector 92, the determiner 94, the generator 95, the starter 96, and the controller 98.

The transition processor 91 performs transition processing for allowing the image forming apparatus 100 to transition to the energy-saving mode.

The transition processor 91 performs an operation in accordance with a program (part of the above-described control program) which is stored in the storage device 90 and is necessary for execution of the transition processing. The processing executed by this operation is the transition processing. For example, the transition processor 91 stops receipt of an input signal and turns off the power of predetermined functional components requiring a large amount of power consumption, such as the image formation functional device 5, the fixing device 6, and the display device 10 which have been described with reference to FIG. 1.

The detector 92 detects that the transition processing has been completed. Specifically, the detector 92 detects that the transition processor 91 has completed the operation in accordance with the above program necessary for execution of the transition processing, and outputs detection information indicating the completion of the operation to the determiner 94. The detector 92 includes, for example, a program counter and the control device 97 allows the program counter to operate as the detector 92 in accordance with the above control program.

The time measuring device 93 starts counting the time with the start of the transition processing to measure the predetermined time. The predetermined time is a specified time predetermined as a time necessary to complete the transition processing and the predetermined time is previously set on the time measuring device 93.

An example of the time measuring device 93 is an unshown timer IC (integrated circuit). The timer IC is made up of an oscillation circuit, a timing circuit, a pulse-width modulation circuit, a frequency division circuit, and so on which are unshown.

The timer IC starts counting the time with an input of a trigger signal thereto. The timer IC outputs a pulse signal with a constant frequency for the predetermined time. The predetermined time and the pulse width can be set by adjusting the values of an unshown resistor and an unshown capacitor.

The determiner 94 determines whether the transition processing has already been completed at the time when the time measuring device 93 has measured the predetermined time.

For example, when not yet receiving detection information from the detector 92 at the time when the time measuring device 93 has measured the predetermined time, the determiner 94 determines that the transition processor 91 has not yet completed the operation in accordance with the above program necessary for execution of the transition processing.

In this embodiment, it can be determined that the transition processing for allowing the image forming apparatus 100 to transition to the energy-saving mode has not been completed within the predetermined time. This makes it possible for the control system 9 to address a state where the transition processing remains uncompleted due to a deadlock, as will be described hereinafter.

As an example of the above determination processing of the determiner 94, the determiner 94 monitors an unshown program counter (an example of the detector 92).

When the transition processor 91 completes the operation in accordance with the above program, the value of the program counter indicates a memory address of a final instruction of the program. The determiner 94 detects that the value of the program counter has reached the memory address of the final instruction, and thus determines that the operation in accordance with the above program has been completed.

On the other hand, if a deadlock occurs, for example, the program counter stops and the program is trapped into an endless loop.

For example, the determiner 94 determines that the program counter has stopped.

When it is determined that the transition processing has not yet been completed even though the predetermined time has been measured, the generator 95 generates a log of the transition processing. Specifically, when the transition processing has not yet been completed even though the predetermined time has been measured, the generator 95 considers that a deadlock has occurred, and generates a log indicating the occurrence of a deadlock.

In this embodiment, when the transition processing has not been completed within the predetermined time, a log of the transition processing is recorded.

The log is used for the purpose of identifying the cause of the deadlock.

The log contains, for example, a time stamp, process/thread information, resource information, a stack trace, lock information, and a log level.

The time stamp indicates the time at which the deadlock has occurred.

The process/thread information indicates information on process/thread that triggered the deadlock.

The resource information indicates the type, identifier, state, and so on of a resource involved in the deadlock.

The stack trace indicates information on functions and methods having been executed by threads at the time of occurrence of the deadlock.

The lock information indicates information on locks, semaphores, and so on retained by the threads at the time of occurrence of the deadlock.

The log level indicates the level of importance or severity of the deadlock information.

When the log indicates that the transition processing reaches a deadlock, the display device 10 displays an error code based on the log.

As just described, in this embodiment, the display device 10 displays, based on the log, an error code indicating the occurrence of a deadlock. Hence, for example, by analyzing the error code, the user can implement measures to resolve the deadlock in such a manner as will be described hereinafter.

The error code is, for example, a combination of numbers and a sequence of characters, such as "Error".

When the log indicates that the transition processing reaches a deadlock, the starter 96 restarts the image forming apparatus 100.

In this embodiment, when the deadlock timer (the time measuring device 93) times out, it is possible to resolve a deadlock by restarting the image forming apparatus.

The time measuring device 93 further measures the predetermined time, then stops counting the time, and resets the time count.

In this embodiment, by reset of the time count, the image forming apparatus 100 prepares for the next occurrence of a deadlock.

Next, a further description will be given of the process of the control system 9 of the image forming apparatus 100 according to this embodiment with reference to FIGS. 3 and 4.

Figure 3:
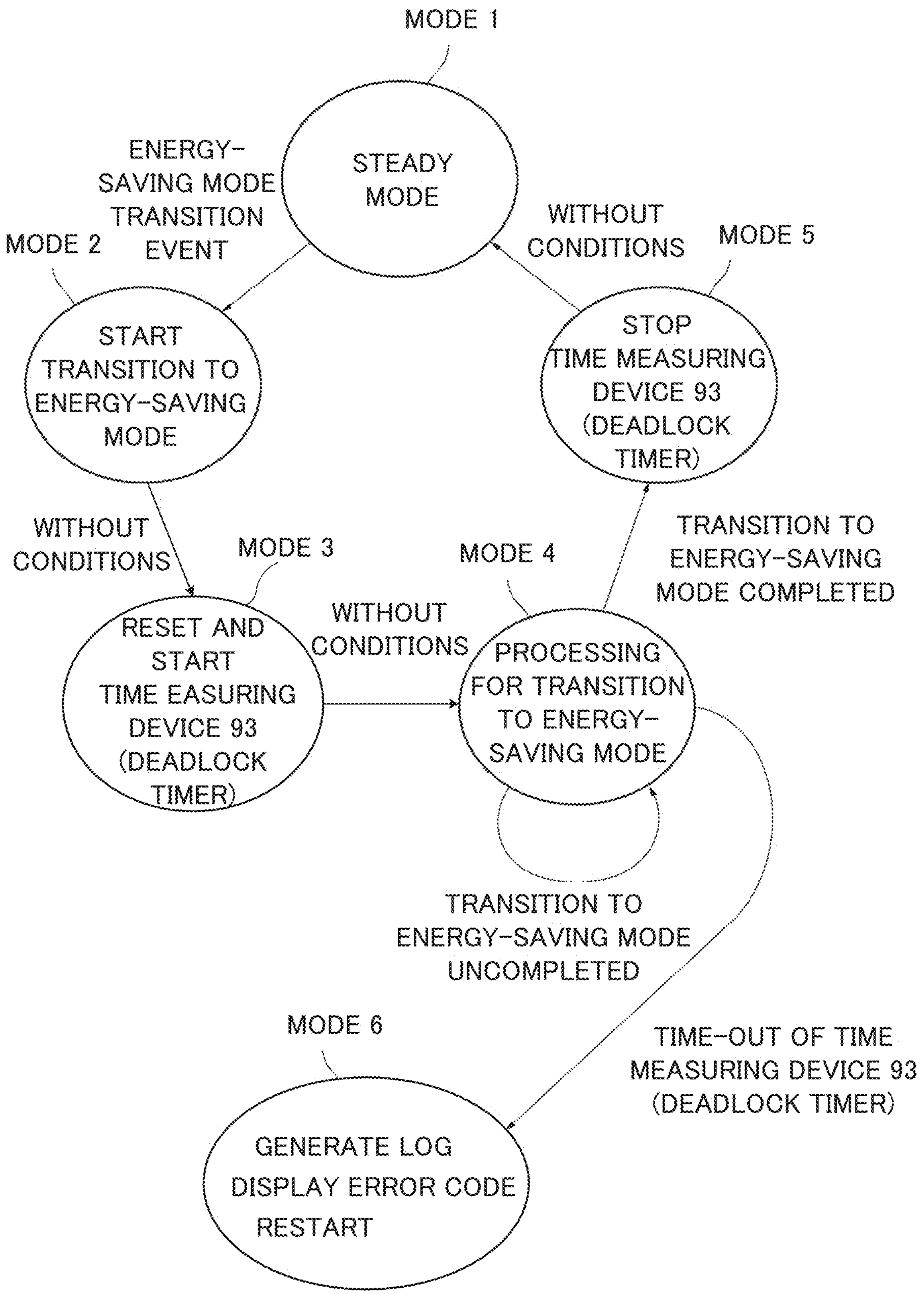
FIG. 3 is a diagram showing mode transitions of the control system.

FIG. 3 is a diagram showing mode transitions of the control system 9 of the image forming apparatus 100 according to this embodiment. FIG. 4 is a flowchart showing a control flow of the control system 9.

As shown in FIG. 3, the mode transitions of the control system 9 include Mode 1 to Mode 6.

Mode 1 shown in FIG. 3 shows that the image forming apparatus 100 is in a steady mode. Now, suppose that an energy-saving mode transition event (job or task) has occurred. In this case, the mode transitions to Mode 2.

In Mode 2, the transition processor 91 starts the processing for transition to the energy-saving mode. The mode transitions to Mode 3 without any conditions.

In Mode 3, the time measuring device 93 functions as a deadlock timer to first reset the count and then start counting the time. Mode 3 transitions to Mode 4 without any conditions.

In Mode 4, the transition processor 91 executes the transition processing. When the processing for transition to the energy-saving mode is complete, Mode 4 transitions to Mode 5.

In Mode 5, the time measuring device 93 stops counting the time. Mode 5 transitions to Mode 1 without any conditions.

While the processing for transition to the energy-saving mode remains uncompleted in Mode 4, Mode 4 is looped. When the time measuring device 93 has measured the predetermined time and times out, Mode 4 transitions to Mode 6.

In Mode 6, the generator 95 generates a log as described previously and the display device 10 displays an error code. If necessary, the starter 96 restarts the image forming apparatus 100.

Next, a description will be given of the control flow with reference to FIG. 4. The process shown in FIG. 4 includes Steps S10 to S20.

Figure 4:
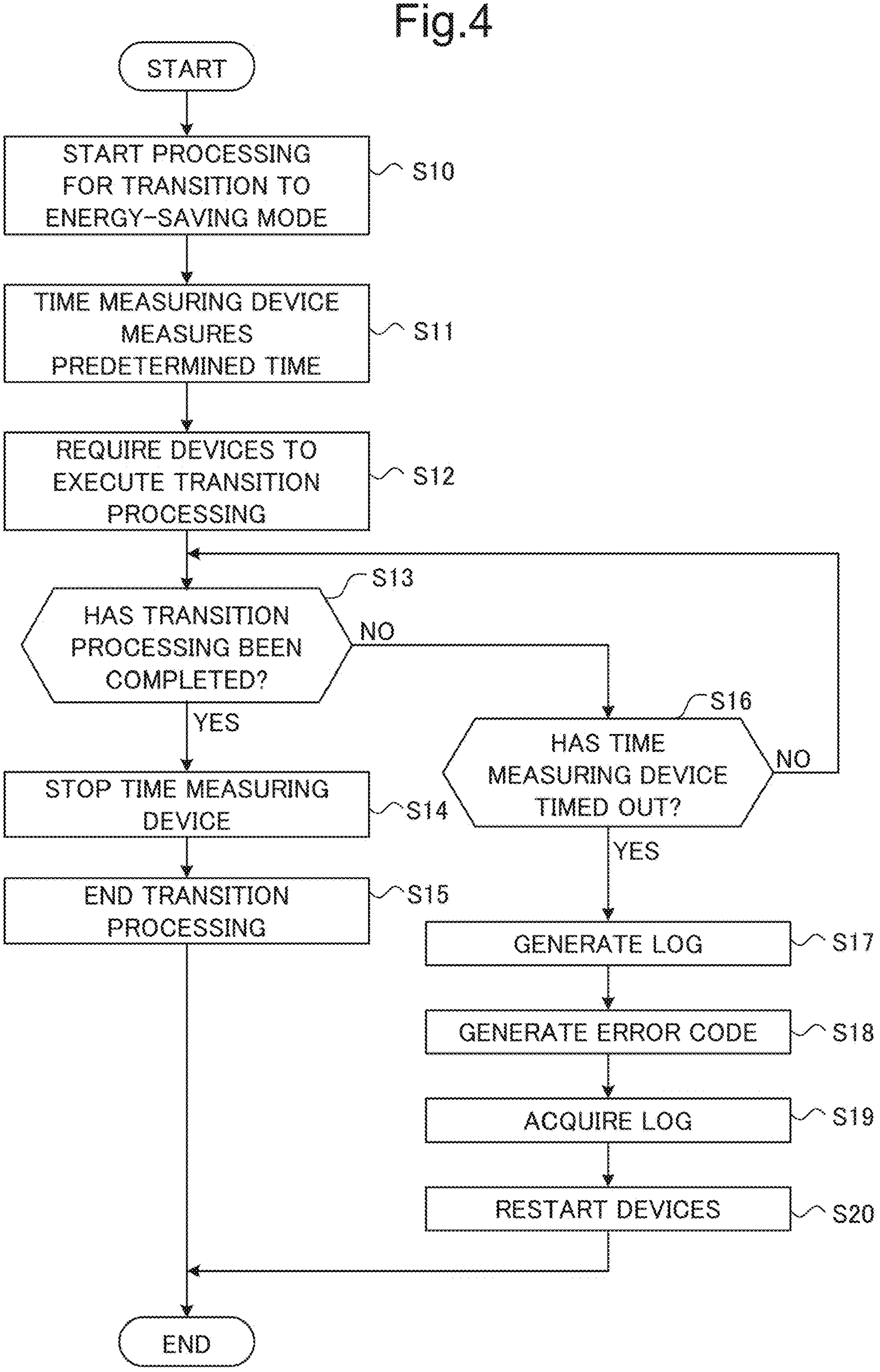
FIG. 4 is a flowchart showing a control flow of the control system.

In Step S10 shown in FIG. 4, the transition processor 91 starts processing for transition to the energy-saving mode. The process goes to Step S11.

In Step S11, the time measuring device 93 starts measuring the predetermined time. The process goes to Step S12.

In Step S12, the transition processor 91 requires each component (device) of the image forming apparatus 100 to execute processing for transition to the energy-saving mode. For example, the transition processor 91 stops receipt of an input signal and turns off the power of predetermined functional components requiring a large amount of power consumption, such as the image formation functional device 5, the fixing device 6, and the display device 10. Thereafter, the process goes to Step S13.

In Step S13, the determiner 94 determines whether or not the transition processing has been completed. When it is determined that the transition processing has been completed (Yes in Step S13), the process goes to Step S14.

On the other hand, when the determiner 94 determines that the transition processing has not yet been completed (No in Step S13), the process goes to Step S16. When the answer in Step S13 is Yes, the time measuring device 93 stops counting the time in Step S14. The process goes to Step S15.

In Step S15, the transition processor 91 ends the transition processing. Thus, the process ends.

On the other hand, when the answer in Step S13 is No, it is determined in Step S16 whether or not the time measuring device 93 has timed out (whether or not the predetermined time has been measured).

When the time measuring device 93 has timed out (Yes in Step S16), the process goes to Step S17. When the time measuring device 93 has not timed out (No in Step S16), the process goes back to Step S13.

When the time measuring device 93 has timed out (Yes in Step S16), the generator 95 generates a log in Step S17. The process goes to Step S18.

In Step S18, the generator 95 generates an error code. The process goes to Step S19.

In Step S19, the starter 96 acquires the log. The process goes to Step S20.

In Step S20, the starter 96 restarts each device of the image forming apparatus 100. Thus, the process ends.

An image forming apparatus during energy saving control, such as transition to a sleep mode, may stop the control (cause a deadlock) due to device access anomaly or other factors. An image forming apparatus not according to the above embodiment includes no means for determining that the energy saving control has not been completed within a predetermined time because of the occurrence of a deadlock.

Unlike this, in the above embodiment, it can be determined that the transition processing for transition to the energy-saving mode has not been completed within the predetermined time.

The description of the embodiment of the present disclosure has so far been given with reference to the drawings. However, the present disclosure is not limited to the above embodiment and can be implemented in various forms without departing from the gist of the present disclosure. For the sake of ease of understanding, the drawings are schematic representation, primarily of components. The number of components and so on shown in the drawings are different from those of actual components for convenience of creation of the drawings. The components described in the above embodiment are merely illustrative, not particularly limited, and can be changed variously without substantially departing from the effects of the present disclosure.

INDUSTRIAL APPLICABILITY

The present disclosure is applicable to the field of image forming apparatuses.

What is claimed is:

1. An image forming apparatus comprising:

a time measuring device that measures a predetermined time; and a control device that includes a processor and operates, through the processor executing a control program, as (i) a transition processor that performs transition processing for allowing the image forming apparatus to transition to an energy-saving mode, (ii) a detector that detects that the transition processing has been completed, and (iii) a determiner that determines, in a case where measuring is started by the time measuring device when the transition processing for allowing the image forming apparatus to transition to the energy-saving mode is started by the transition processor, the time measuring device has measured lapse of the predetermined time from start of the transition processing, and not yet obtaining from the detector detection information indicating completion of the transition processing, that the transition processing has not yet been completed.

2. The image forming apparatus according to claim 1, wherein after measuring the predetermined time, the time measuring device stops counting the time and resets a time count.

3. An image forming apparatus comprising:

a time measuring device that measures a predetermined time; and a control device that includes a processor and operates, through the processor executing a control program, as (i) a transition processor that performs transition processing for allowing the image forming apparatus to transition to an energy-saving mode, (ii) a detector that detects that the transition processing has been completed, (iii) a determiner that determines, when not yet obtaining from the detector detection information indicating completion of the transition processing at a time when the time measuring device has measured lapse of the predetermined time from start of the transition processing, that the transition processing has not yet been completed, and (iv) a generator that, when it is determined that the transition processing has not yet been completed even though the predetermined time has been measured, generates a log of the transition processing.

4. The image forming apparatus according to claim 3, wherein when it is determined that the transition processing has not yet been completed even though the predetermined time has been measured, the generator considers that a deadlock has occurred and generates the log of the transition processing indicating occurrence of the deadlock.

5. The image forming apparatus according to claim 4, further comprising a display device that, when the log indicates that the transition processing reaches a deadlock, displays an error code based on the log.

6. The image forming apparatus according to claim 4, the control device further operates, through the processor executing the control program, as a starter that, when the log indicates that the transition processing reaches a deadlock, restarts the image forming apparatus based on the log.

* * * * *